United States Patent
McElroy

(10) Patent No.: US 6,630,263 B1
(45) Date of Patent: Oct. 7, 2003

(54) FUEL CELL SYSTEMS AND METHODS

(75) Inventor: James F. McElroy, Suffield, CT (US)

(73) Assignee: Plug Power Inc., Latham, NY (US)

( * ) Notice: Subject to any disclaimer, the term of this patent is extended or adjusted under 35 U.S.C. 154(b) by 155 days.

(21) Appl. No.: 09/716,346

(22) Filed: Nov. 20, 2000

(51) Int. Cl.⁷ .......................... H01M 8/10; H01M 4/86; H01M 4/92
(52) U.S. Cl. .............. 429/30; 429/40; 429/33
(58) Field of Search .............. 429/30, 32, 33, 429/40, 41, 42, 43, 44, 45

(56) References Cited

U.S. PATENT DOCUMENTS

| | | |
|---|---|---|
| 5,186,877 A | 2/1993 | Watanabe |
| 5,211,984 A | 5/1993 | Wilson |
| 5,234,777 A | 8/1993 | Wilson |
| 5,272,017 A | 12/1993 | Swathirajan et al. |
| 5,316,871 A | 5/1994 | Swathirajan et al. |
| 5,330,860 A | 7/1994 | Grot et al. |
| 5,415,888 A | 5/1995 | Banerjee et al. |
| 5,472,799 A * | 12/1995 | Watanabe ................... 429/30 |
| 5,480,518 A | 1/1996 | Shane et al. |
| 5,547,911 A | 8/1996 | Grot |
| 5,702,755 A | 12/1997 | Mussell |
| 5,906,716 A | 5/1999 | Mertesdorf et al. |
| 5,945,232 A * | 8/1999 | Ernst et al. ................ 429/32 |
| 5,958,616 A | 9/1999 | Salinas et al. |
| 6,020,083 A | 2/2000 | Breault et al. |
| 6,074,692 A | 6/2000 | Hulett |
| 6,074,773 A | 6/2000 | Wilkinson et al. |
| 6,207,312 B1 * | 3/2001 | Wynne et al. ............ 429/30 X |
| 6,277,512 B1 * | 8/2001 | Hamrock et al. ............. 429/33 |

FOREIGN PATENT DOCUMENTS

JP         2000-277128         * 10/2000

* cited by examiner

Primary Examiner—Stephen Kalafut
(74) Attorney, Agent, or Firm—Fish & Richardson P.C.

(57) ABSTRACT

Fuel cell systems and methods having relatively long use lifetimes are disclosed. The systems and methods can provide relatively long lifetimes when one or more reactant gas streams is unsaturated with water. The systems and methods can use proton exchange membranes having relatively long use lifetimes.

25 Claims, 3 Drawing Sheets

FUEL CELL SYSTEMS AND METHODS

TECHNICAL FIELD

The invention relates to fuel cell systems and methods having relatively long use lifetimes.

BACKGROUND

A fuel cell can convert chemical energy to electrical energy by promoting a chemical reaction between two gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas passes through the anode gas diffusion layer and interacts with the anode catalyst. Similarly, as the cathode gas flows through the channels of the cathode flow field plate, the cathode gas passes through the cathode gas diffusion layer and interacts with the cathode catalyst.

The anode catalyst interacts with the anode gas to catalyze the conversion of the anode gas to reaction intermediates. The reaction intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Electrons are formed at the anode side of the membrane electrode assembly, indicating that the anode gas undergoes oxidation during the fuel cell reaction. Electrons are consumed at the cathode side of the membrane electrode assembly, indicating that the cathode gas undergoes reduction during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \tag{1}$$

$$\tfrac{1}{2}O_2 + 2H^+ + 2e^- \rightarrow H_2O \tag{2}$$

$$H_2 + \tfrac{1}{2}O_2 \rightarrow H_2O \tag{3}$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water or other low conductivity fluids) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

SUMMARY

The invention relates to fuel cell systems and methods having relatively long use lifetimes. In some embodiments, the relatively long use lifetimes can be achieved even when using one or more reactant gas streams that are unsaturated with water.

In one aspect, the invention generally features a fuel cell that includes a cathode flow field plate, an anode flow field plate and a proton exchange membrane. The proton exchange membrane includes a catalyst material and a proton exchange material. The catalyst material is incorporated in the proton exchange material. In some embodiments, the fuel cell can be in a system, such as a fuel cell stack, containing one or more additional fuel cells.

The catalyst material can be formed of a material capable of catalyzing the reaction of hydrogen and oxygen to form water. The catalyst material can be formed of a metal or an alloy, such as platinum or a platinum-containing alloy. The catalyst material can be in the form of discrete particles. The catalyst material can be present in an amount so that an electrical conductivity of the proton exchange membrane is about the same as an electrical conductivity of the proton exchange material. The proton exchange membrane can include from about 0.0001 milligrams to about 0.010 milligrams per square centimeter of the catalyst material per micrometer of proton exchange membrane thickness. The proton exchange material can be formed of a perfluorinated sulfonic acid material, such as NAFION®.

In another aspect, the invention generally features a membrane electrode assembly that includes a cathode catalyst, an anode catalyst and a proton exchange membrane between the cathode and anode catalysts. The planar area of the cathode catalyst is from about 90% to about 99.9% of the planar area of the anode catalyst (e.g., from about 95% to about 99.5%, from about 97% to about 99%, about 98%).

The proton exchange membrane can be formed of a proton exchange material having a catalyst material incorporated therein.

In a further aspect, the invention generally features a fuel cell that includes a cathode flow field plate, an anode flow field plate, a proton exchange membrane between the cathode and anode flow field plates, a cathode catalyst between the proton exchange membrane and the cathode flow field plate, and an anode catalyst between the proton exchange membrane and the anode flow field plate. The region adjacent the inlet region of the cathode flow field plate and/or the region adjacent the inlet region of the anode flow field plate is substantially devoid of the cathode catalyst.

The proton exchange membrane can be formed of a proton exchange material having a catalyst material incorporated therein.

In another aspect, the invention generally features a proton exchange membrane that includes a porous reinforcing material impregnated with a catalyst material.

The proton exchange membrane can further include an additional catalyst material disposed within the porous reinforcing material of the other proton exchange material.

In a further aspect, the invention generally features a method of operating a fuel cell. The fuel cell includes a cathode flow field plate and an anode flow field plate. The method includes flowing a gas mixture containing a cathode gas through the cathode flow field plate, and flowing a gas mixture containing an anode gas through the anode flow field plate to produce a fuel cell power output greater than zero. The gas mixture flowing through the cathode flow field plate is not saturated with water and/or the gas mixture flowing through the anode flow field plate is not saturated with water. After flowing the gas mixtures for a period of time (e.g., at least about 20,000 hours, at least about 50,000 hours, at least about 100,000 hours), the fuel cell power output is at least about the same as the power output produced by the fuel cell when the method is performed with the first and second gas mixtures saturated with water.

In another aspect, the invention generally features a method of operating a fuel cell. The fuel cell includes a cathode flow field plate and an anode flow field plate. The method includes flowing a gas mixture containing a cathode gas through the cathode flow field plate, and flowing a gas mixture containing an anode gas through the anode flow field plate to produce a fuel cell power output greater than zero. The gas mixture flowing through the cathode flow field plate is not saturated with water and/or the gas mixture flowing through the anode flow field plate is not saturated with water. After flowing the gas mixtures for a period of time (e.g., at least about 20,000 hours, at least about 50,000 hours, at least about 100,000 hours), the fluorine concentration in the fuel cell product water output is less than or about the same as the fluorine concentration in the fuel cell product water output when the method is performed with the first and second gas mixtures saturated with water.

DETAILED DESCRIPTION

The invention relates to fuel cell systems and methods having relatively long use lifetimes.

Figure 1:
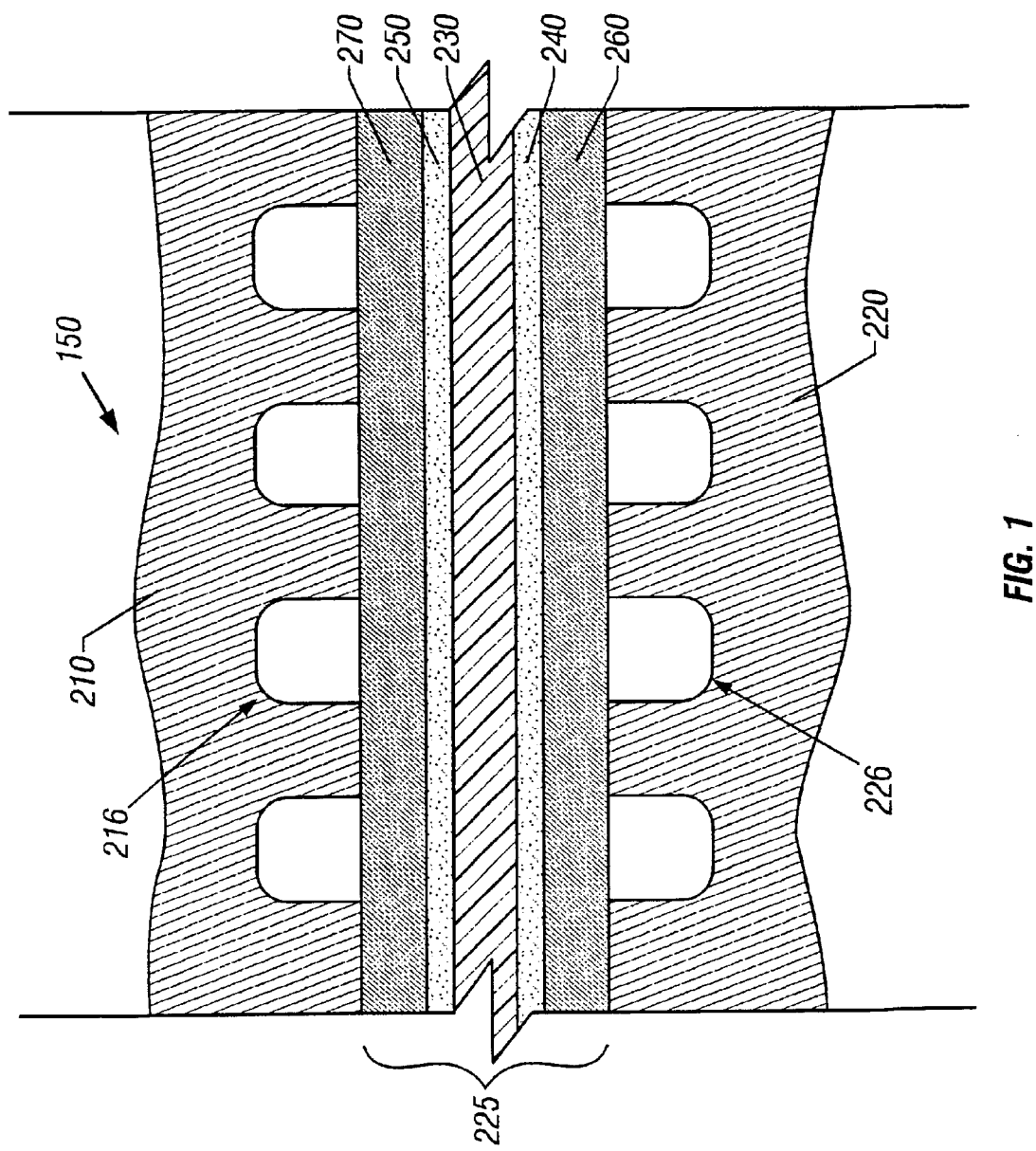
FIG. 1 is a cross-sectional view of a fuel cell.

FIG. 1 is a cross-sectional view of a PEM fuel cell 150 that includes a cathode flow field plate 210, an anode flow field plate 220 and a membrane electrode assembly 225. Membrane electrode assembly 225 includes a PEM 230, an anode catalyst 240, a cathode catalyst 250, an anode gas diffusion layer 260, a cathode gas diffusion layer 270. Cathode flow field plate 210 has channels 216, and anode flow field plate 220 has channels 226.

PEM 230 is formed of a proton exchange material having a catalyst material incorporated therein (e.g., the catalyst material is at least partially or entirely disposed within the proton exchange material).

Examples of proton exchange materials include perfluorinated sulfonic acid materials (e.g., NAFION®, available from E. I. duPont deNemours & Co., located in Wilmington, Del.) and perfluorocarbon materials (e.g., FLEMION®, available from Asahi Glass Corporation located in Tokyo, Japan).

Generally, the catalyst material in PEM 230 is capable of catalyzing the reaction of certain water-formation intermediates, such as hydrogen peroxide and/or hydroxyl radicals, to water. In some embodiments, the catalyst material is a metal or an alloy, such as platinum or a platinum-containing alloy.

Without wishing to be bound by theory, it is believed that certain water-formation intermediates, such as hydrogen peroxide and/or hydroxyl radicals, can reduce the use lifetime of proton exchange materials by oxidizing the materials. It is further believed that the catalyst material present in PEM 230 can prolong the use lifetime of PEM 230 by catalyzing the reaction of these water-formation intermediates to undergo reactions other than proton exchange material oxidation reactions, thereby reducing the tendency of these intermediates to oxidize the proton exchange material present in PEM 230.

In general, the amount of catalyst material incorporated in PEM 230 should be insufficient to cause a substantial increase in the electrical conductivity of PEM 230 relative to the electrical conductivity of the proton exchange material so that PEM 230 does not create a low electrical resistance path between cathode flow field plate 210 and anode flow field plate 220 (e.g., the electrical conductivity of PEM 230 is substantially the same as the electrical conductivity of the proton exchange material).

In some embodiments, PEM 230 contains from about 0.0001 to about 0.010 milligrams per square centimeter of the catalyst material per micrometer thickness of PEM 230 (e.g., from about 0.001 to about 0.03 milligrams per square centimeter of the catalyst material per micrometer thickness of PEM 230, about 0.005 milligrams of the catalyst material per square centimeter per micrometer thickness of PEM 230).

In some embodiments, the catalyst material is present in PEM 230 in the form of discrete particles. Without wishing to be bound by any theory, it is believed that using discrete particles of the catalyst material in the proton exchange material can inhibit the formation of relatively low electrical resistance paths through PEM 230, thereby decreasing the possibility that PEM 230 will form a relatively low electrical resistance path between cathode flow field plate 210 and anode flow field plate 220 while still allowing the catalyst material present in PEM 230 to catalyze the reaction of certain water-formation intermediates to water.

In one embodiment, PEM 230 is formed of NAFION® that has incorporated therein about 0.005 milligrams of discrete platinum particles per square centimeter per micrometer thickness of PEM 230.

Figure 2:
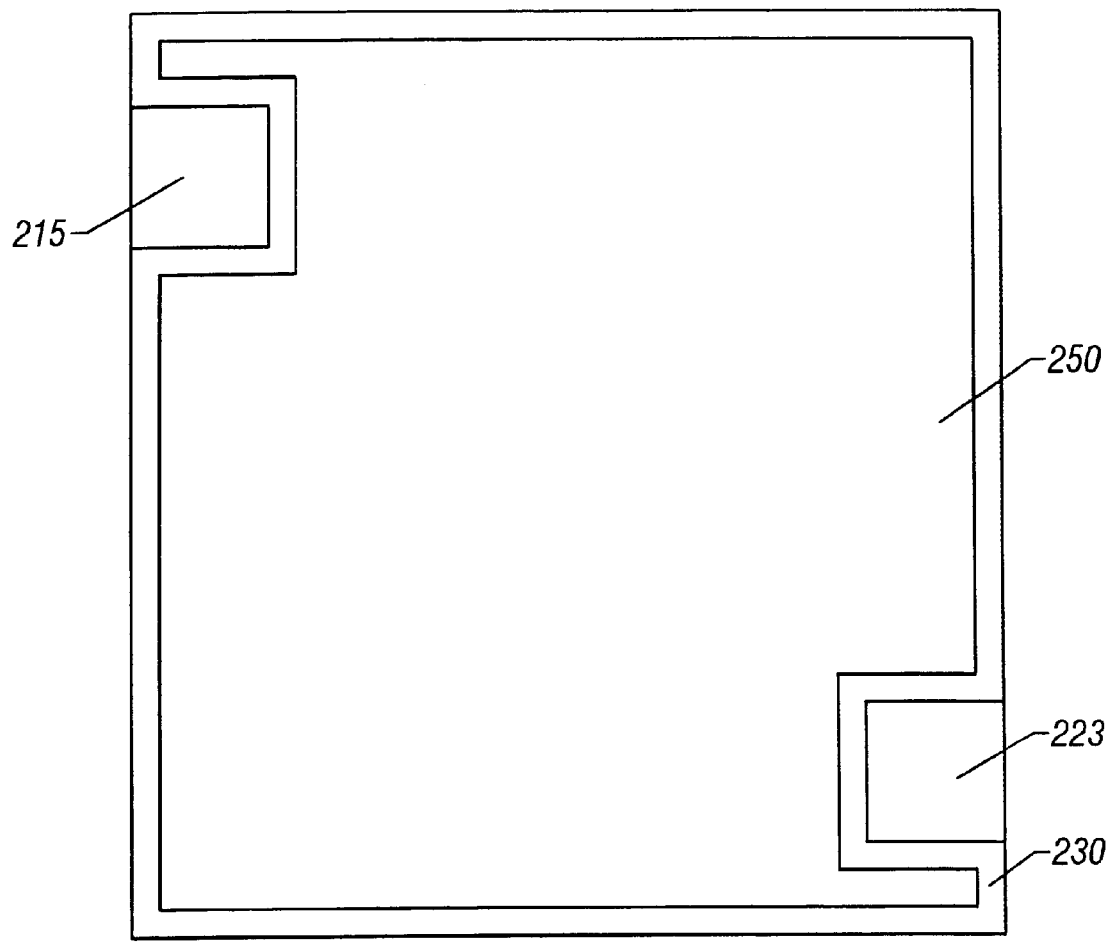
FIG. 2 is a planar view of a proton exchange membrane.

FIG. 2 is a planar view of PEM 230, showing the planar area of cathode catalyst 250 onto the planar area of PEM 230. FIG. 2 also shows the projection of the planar area of an inlet 215 of cathode flow field plate 210 and an inlet 223 of anode flow field plate 220 onto the planar area of PEM 230.

As shown in FIG. 2, cathode catalyst 250 is not present in the region adjacent inlets 215 and 223. Without wishing to be bound by theory, it is believed that removing substantially all cathode catalyst from the region adjacent inlets 215 and 223 reduces the tendency of fuel cell 150 to form certain water-formation intermediates, such as hydrogen peroxide and/or hydroxyl radicals, in the region adjacent inlets 215 and 223. It is believed that these radicals participate in the oxidation of PEM 230. Thus, it is believed that, by reducing the tendency of these intermediates to form in the region adjacent inlets 215 and 223, the tendency of PEM 230 to undergo oxidation in the region adjacent inlets 215 and 223 is also reduced. It is believed that this can be particularly desirable when operating fuel cell 150 under certain conditions, such as when one or more of the reactant gas streams is unsaturated with water, because it is believed that it is under these conditions that the portions of PEM 230 adjacent the region of inlets 215 and 223 can have a relatively high susceptibility to oxidation by the water-formation intermediates.

Because fuel cell 150 is substantially devoid of cathode catalyst 250 in the region adjacent inlets 215 and 223, the planar area of cathode catalyst 250 is less than the planar area of anode catalyst 240. In some embodiments, the planar area of cathode catalyst 250 is from about 90% to about 99.9% of the planar area of anode catalyst 240 (e.g., from about 95% to about 99.5%, from about 97% to about 99%, about 98%).

Figure 3:
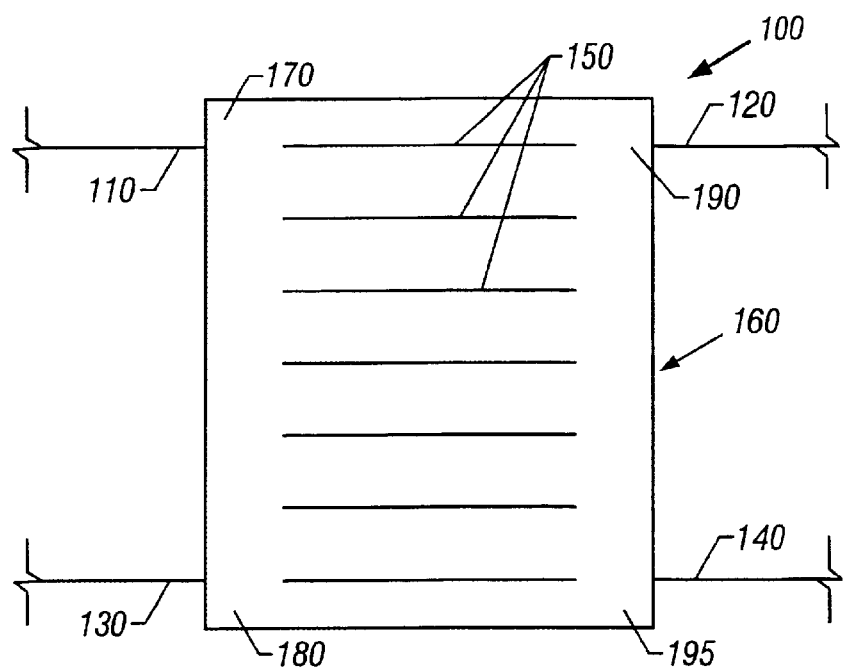
FIG. 3 is a schematic of a fuel cell system.

FIG. 3 shows a fuel cell system 100 that includes a fuel cell stack 160 having PEM fuel cells 150. Fuel cell system 100 also includes an inlet cathode gas stream 110, an outlet cathode gas stream 120, an inlet anode gas stream 130, and an outlet anode gas stream 140. Gas stream 110 contains a gas mixture including a cathode gas, and gas stream 130 contains a gas mixture including an anode gas. The gas mixture contained in gas stream 110 enters fuel cell stack 160 at inlet 170, and the gas mixture contained in gas stream 130 enters fuel cell stack 160 at inlet 180. After entering fuel cell stack 160, the cathode and anode gases flow through fuel cells 150, and react to produce power (e.g., electricity) and water. Unreacted gases and product species exit fuel cell stack 160 in gas streams 120 and 140 at outlets 190 and 195, respectively.

Because fuel cells 150 are designed so that PEM 230 has a relatively high resistance to oxidation during the water formation process, the gas mixture used in cathode inlet stream 110 can be unsaturated with water and/or the gas mixture in anode inlet stream 130 can be unsaturated with water, and fuel cells 150 can still exhibit relatively long useful lifetimes.

The relatively long useful lifetimes of fuel cells 150 can be measured, for example, by the amount of fluorine contained in the product water in the gas mixture in gas stream 140 when fuel cell system 100 is operated when the gas mixture in gas streams 110 and/or 130 are unsaturated with water relative to the amount of fluorine contained and/or by the in the product water in the gas mixture in gas stream 140 when fuel cell system 100 is operated when the gas mixture in gas streams 110 and 130 are saturated with water. Preferably, the relative amount of water contained in the gas mixture in gas stream 140 is less than or substantially about the same after fuel cell system 100 has been operating for an extended period of time (e.g., about 20,000 hours, about 50,000 hours, about 100,000 hours.

Alternatively or additionally, the relatively long useful lifetimes of fuel cells 150 can be measured, for example, by the amount of power (e.g., electricity) produced by fuel cell system 100 when system 100 is operated when the gas mixture in gas streams 110 and/or 130 are unsaturated with water relative to the amount of power (e.g., electricity) produced by system 100 when system 100 is operated when the gas mixture in gas streams 110 and 130 are saturated with water. Preferably, the relative amount of power (e.g., electricity) produced by system 100 is more than or substantially about the same after fuel cell system 100 has been operating for an extended period of time (e.g., about 20,000 hours, about 50,000 hours, about 100,000 hours.

Figure 4:
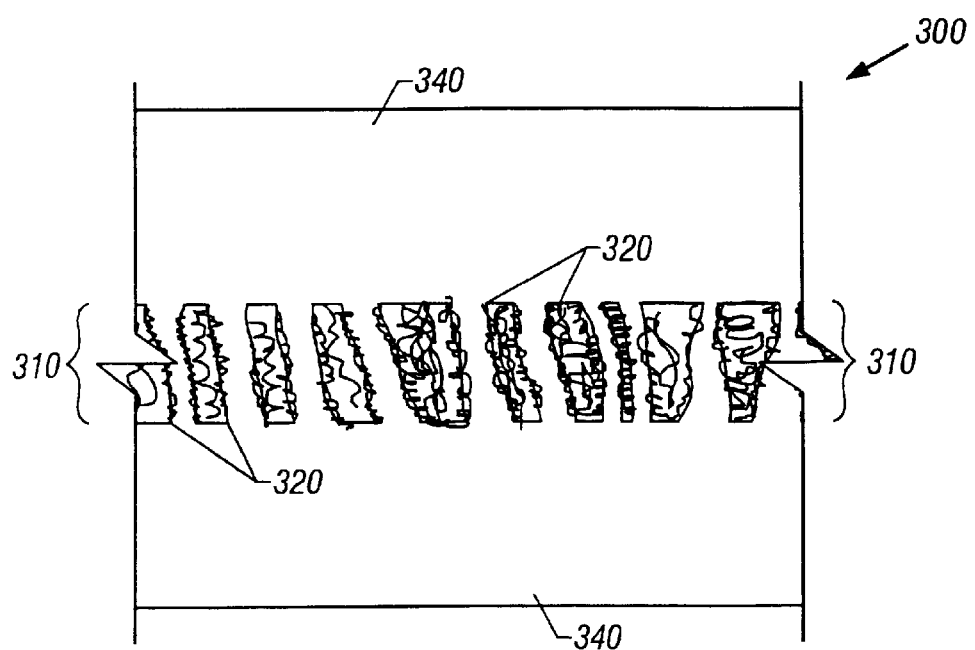
FIG. 4 is a cross-sectional view of a proton exchange membrane.

While an embodiment of a PEM that can be used in fuel cell 150 has been described herein, other embodiments of PEMs are possible. FIG. 4 is a cross-sectional view of an alternate embodiment of a PEM 300 that can be used in fuel cell 150. PEM 300 includes a porous layer of a reinforcing material (e.g., PTFE) 310, catalyst material 320, and proton exchange membrane material 340. Material 340 can be one or more of the proton exchange materials described above, and material 320 can be one or more of the catalyst materials described above.

While certain embodiments of the invention have been described herein, the invention is not limited to these embodiments. For example, in some embodiments, rather than being substantially devoid of cathode catalyst in the region adjacent the inlets of the cathode and anode flow field plates, the fuel cell(s) may be substantially devoid of the anode catalyst in these regions. In certain embodiments, one or more fuel cells can by substantially devoid of both cathode and anode catalyst in the region adjacent the inlets of the cathode and anode flow field plates. Moreover, in some embodiments, it is only in the region of one of the inlets that the fuel cell(s) are devoid of cathode catalyst and/or anode catalyst. Other embodiments are in the claims.

What is claimed is:

1. A fuel cell, comprising:
    a cathode flow field plate;
    an anode flow field plate;
    an anode catalyst;
    a cathode catalyst; and
    a proton exchange membrane, comprising:
        a catalyst material; and
        a proton exchange material,
        wherein the catalyst material is incorporated in the proton exchange material, the cathode catalyst is between the proton exchange membrane and the cathode flow field plate, the proton exchange membrane is between the cathode and anode catalysts, and a planar area of the cathode catalyst is from about 90% to about 99.9% of a planar area of the anode catalyst.

2. The fuel cell of claim 1, wherein the catalyst material comprises a material capable of catalyzing the reaction of hydrogen and oxygen to form water.

3. The fuel cell of claim 2, wherein the catalyst material comprises a material selected from the group consisting of metals and alloys.

4. The fuel cell of claim 3, wherein the catalyst material comprises platinum.

5. The fuel cell of claim 1, wherein the catalyst material is in the form of discrete particles.

6. The fuel cell of claim 1, wherein the catalyst material is present in an amount so that an electrical conductivity of the proton exchange membrane is about the same as an electrical conductivity of the proton exchange material.

7. The fuel cell of claim 1, wherein the proton exchange membrane has a thickness and the proton exchange membrane comprises from about 0.0001 milligrams per square centimeter of the catalyst material per micrometer of proton exchange membrane thickness to about 0.010 milligrams per square centimeter of the catalyst material per micrometer of proton exchange membrane thickness.

8. The fuel cell of claim 1, wherein the proton exchange material comprises a perfluorinated sulfonic acid material.

9. A fuel cell system, comprising
    a first fuel cell, comprising:
        a cathode flow field plate;
        an anode flow field plate;
        an anode catalyst;
        a cathode catalyst; and
        a proton exchange membrane, comprising:
            a catalyst material; and
            a proton exchange material,
            wherein the catalyst material is incorporated in the proton exchange material, the cathode catalyst is between the proton exchange membrane and the cathode flow field plate; and
    a second fuel cell, comprising:
        a cathode flow field plate;
        an anode flow field plate; and
        a proton exchange membrane,
        wherein the cathode flow field plates of the first and second fuel cells are in fluid communication, the anode flow field plates of the first and second fuel cells are in fluid communication, the proton exchange membrane of the first fuel cell is between the cathode and anode catalysts of the first fuel cell, and a planar area of the cathode catalyst of the first fuel cell is from about 90% to about 99.9% of a planar area of the anode catalyst of the first fuel cell.

10. The fuel cell of claim 9, wherein the catalyst material comprises a material capable of catalyzing the reaction of hydrogen and oxygen to form water.

11. The fuel cell system of claim 10, wherein the catalyst material comprises a material selected from the group consisting of metals and alloys.

12. The fuel cell system of claim 11, wherein the catalyst material comprises platinum.

13. The fuel cell system of claim 9, wherein the catalyst material is in the form of discrete particles.

14. The fuel cell system of claim 9, wherein the catalyst material is present in an amount so that an electrical conductivity of the proton exchange membrane is about the same as an electrical conductivity of the proton exchange material.

15. The fuel cell system of claim 9, wherein the proton exchange membrane has a thickness and the proton exchange membrane comprises from about 0.0001 milligrams per square centimeter of the catalyst material per micrometer of proton exchange membrane thickness to about 0.010 milligrams per square centimeter of the catalyst material per micrometer of proton exchange membrane thickness.

16. The fuel cell system of claim 9, wherein the proton exchange material comprises a perfluorinated sulfonic acid material.

17. A membrane electrode assembly, comprising:
    a cathode catalyst having a planar area;
    an anode catalyst having a planar area; and
    a proton exchange membrane between the cathode and anode catalysts,
    wherein the planar area of the cathode catalyst is from about 90% to about 99.9% of the planar area of the anode catalyst.

18. The membrane electrode assembly of claim 17, wherein the planar area of the cathode catalyst is from about 95% to about 99.5% of the planar area of the anode catalyst.

19. The membrane electrode assembly of claim 17, wherein the planar area of the cathode catalyst is from about 97% to about 99% of the planar area of the anode catalyst.

20. The membrane electrode assembly of claim 17, wherein the planar area of the cathode catalyst is about 98% of the planar area of the anode catalyst.

21. The membrane electrode assembly of claim 17, wherein the proton exchange membrane comprises a catalyst material and a proton exchange material, the catalyst material being incorporated in the proton exchange material.

22. The fuel cell of claim 21, wherein the catalyst material comprises a material capable of catalyzing the reaction of hydrogen and oxygen to form water.

23. A fuel cell, comprising:
    a cathode flow field plate having an inlet region;
    an anode flow field plate having an inlet region;
    a proton exchange membrane between the cathode and anode flow field plates, the proton exchange membrane comprising a catalyst material and a proton exchange material, the catalyst material being incorporated in the proton exchange material;

a cathode catalyst between the proton exchange membrane and the cathode flow field plate; and an anode catalyst between the proton exchange membrane and the anode flow field plate, wherein a region adjacent the inlet region of the cathode flow field plate is substantially devoid of the cathode catalyst, the proton exchange membrane is between the cathode and anode catalysts, and a planar area of the cathode catalyst is from about 90% to about 99.9% of a planar area of the anode catalyst.

24. The fuel cell of claim 23, wherein the region adjacent the inlet region of the cathode flow field plate is substantially devoid of the cathode catalyst.

25. The fuel cell of claim 23, wherein the catalyst material comprises a material capable of catalyzing the reaction of hydrogen and oxygen to form water.

* * * * *